United States Patent
Dingle

(10) Patent No.: US 6,679,200 B2
(45) Date of Patent: Jan. 20, 2004

(54) DIRECT IN-CYLINDER REDUCTANT INJECTION SYSTEM AND A METHOD OF IMPLEMENTING SAME

(75) Inventor: Philip J. G. Dingle, Rochester, MI (US)

(73) Assignee: Delphi Technologies, Inc., Troy, MI (US)

(*) Notice: Subject to any disclaimer, the term of this patent is extended or adjusted under 35 U.S.C. 154(b) by 33 days.

(21) Appl. No.: 10/183,737

(22) Filed: Jun. 27, 2002

(65) Prior Publication Data

US 2003/0226545 A1 Dec. 11, 2003

Related U.S. Application Data

(60) Provisional application No. 60/387,680, filed on Jun. 11, 2002.

(51) Int. Cl.$^7$ .................... F02M 25/00; F02M 27/02
(52) U.S. Cl. ............................................ 123/1 A
(58) Field of Search ................................. 123/1 A

(56) References Cited

U.S. PATENT DOCUMENTS

| | | | | |
|---|---|---|---|---|
| 4,116,591 A | | 9/1978 | Mardell .................... 417/417 |
| 5,266,083 A | * | 11/1993 | Peter-Hoblyn et al. ..... 123/1 A |
| 5,269,275 A | * | 12/1993 | Dahlgren .................. 123/1 A |
| 5,331,924 A | * | 7/1994 | Kraus ...................... 123/1 A |
| 5,404,841 A | * | 4/1995 | Valentine .................. 123/1 A |
| 5,419,286 A | * | 5/1995 | Edison et al. ............. 123/1 A |
| 5,584,265 A | * | 12/1996 | Rao et al. ................ 123/1 A |
| 5,609,026 A | | 3/1997 | Berriman et al. ........... 60/286 |
| 6,051,040 A | * | 4/2000 | Peter-Hoblyn ............. 123/1 A |
| 6,266,955 B1 | * | 7/2001 | Liang et al. .............. 123/1 A |

* cited by examiner

Primary Examiner—Erick Solis
(74) Attorney, Agent, or Firm—Jimmy L. Funke

(57) ABSTRACT

The above discussed and other drawbacks and deficiencies are overcome or alleviated by a reductant injection system for an internal combustion engine including a selective reduction system communicated with the internal combustion engine, a vehicle sensor communicated with the internal combustion engine, a controller, wherein the controller is communicated with the selective reduction system and the vehicle sensor and a reductant storage device communicated with the selective reduction system. In addition, a method for increasing NOx conversion efficiency in an internal combustion engine having a reductant injection system is provided, wherein the method includes obtaining a vehicle data signal responsive to the engine performance of the internal combustion engine, processing the vehicle data signal so as to determine a combustion characteristic of a combustion cylinder, determining an optimum reductant injection timing and introducing a predetermined amount of reductant into the combustion cylinder responsive to the optimum reductant injection timing. Furthermore, a medium encoded with a machine-readable computer program code for increasing NOx conversion efficiency in an internal combustion engine having a reductant injection system is provided, wherein the medium includes instructions for causing controller to implement the aforementioned method.

42 Claims, 4 Drawing Sheets

DIRECT IN-CYLINDER REDUCTANT INJECTION SYSTEM AND A METHOD OF IMPLEMENTING SAME

CROSS-REFERENCE TO RELATED APPLICATIONS

This application claims the benefit of U.S. Provisional Application No. 60/387,680, filed Jun. 11, 2002 the contents of which are incorporated by reference herein in their entirety.

BACKGROUND

Conventional Selective Catalytic Reduction (SCR) of NOx involves injection of a typically aqueous urea solution into the exhaust system ahead of the SCR catalyst. Although this technology allows a steady state NOx conversion efficiency of >90%, transient test cycle NOx conversion efficiencies of only about 80% conversion efficiencies have been achieved. However, this is insufficient given that emission standards for 2007 and beyond will require transient test cycle NOx conversion efficiencies of better than 95%.

Moreover, there are several shortcomings with the current SCR technology. First, current SCR systems only work effectively over an exhaust temperature range of about 275° C. to about 450° C. This means that it cannot be utilized under light load conditions or under high load conditions. Second, it is difficult to match the transient response of the catalyst system to that of the engine over the transient test cycle, resulting in a loss of conversion efficiency or ammonia slip. Third, effectively mixing the urea solution with the exhaust gases may be problematic. Fourth, the precious metal loading of the catalyst makes the catalyst system very expensive.

Although the reduction of NOx through the injection of urea or ammonia compounds directly into the combustion chamber of an engine has been accomplished without a catalyst using a method called Selective Non-Catalytic Reduction (SNCR) and is available at all speeds and for all types of loads, only a 20% to 50% NOx conversion efficiency has been acheived. Unfortunately, this too is insufficient and does not satisfy the future transient test cycle NOx conversion efficiency requirement of circa 95%.

SUMMARY OF THE INVENTION

The above discussed and other drawbacks and deficiencies are overcome or alleviated by a reductant injection system for an internal combustion engine comprising: a selective reduction system communicated with the internal combustion engine; a vehicle sensor communicated with the internal combustion engine; a controller, wherein the controller is communicated with the selective reduction system and the vehicle sensor and a reductant storage device communicated with the selective reduction system.

A method for increasing NOx conversion efficiency in an internal combustion engine having a reductant injection system, comprising: obtaining a vehicle data signal responsive to the engine performance of the internal combustion engine; processing the vehicle data signal so as to determine a combustion characteristic of a combustion cylinder; determining an optimum reductant injection timing and introducing a predetermined amount of reductant into the combustion cylinder responsive to the optimum reductant injection timing.

A medium encoded with a machine-readable computer program code for increasing NOx conversion efficiency in an internal combustion engine having a reductant injection system, the medium including instructions for causing controller to implement the aforementioned method.

The above discussed and other features and advantages of the present invention will be appreciated and understood by those skilled in the art from the following detailed description and drawings.

BRIEF DESCRIPTION OF THE DRAWINGS

Referring to the exemplary drawings wherein like elements are numbered alike in the several Figures.

DETAILED DESCRIPTION OF AN EXEMPLARY EMBODIMENT

Figure 1A:
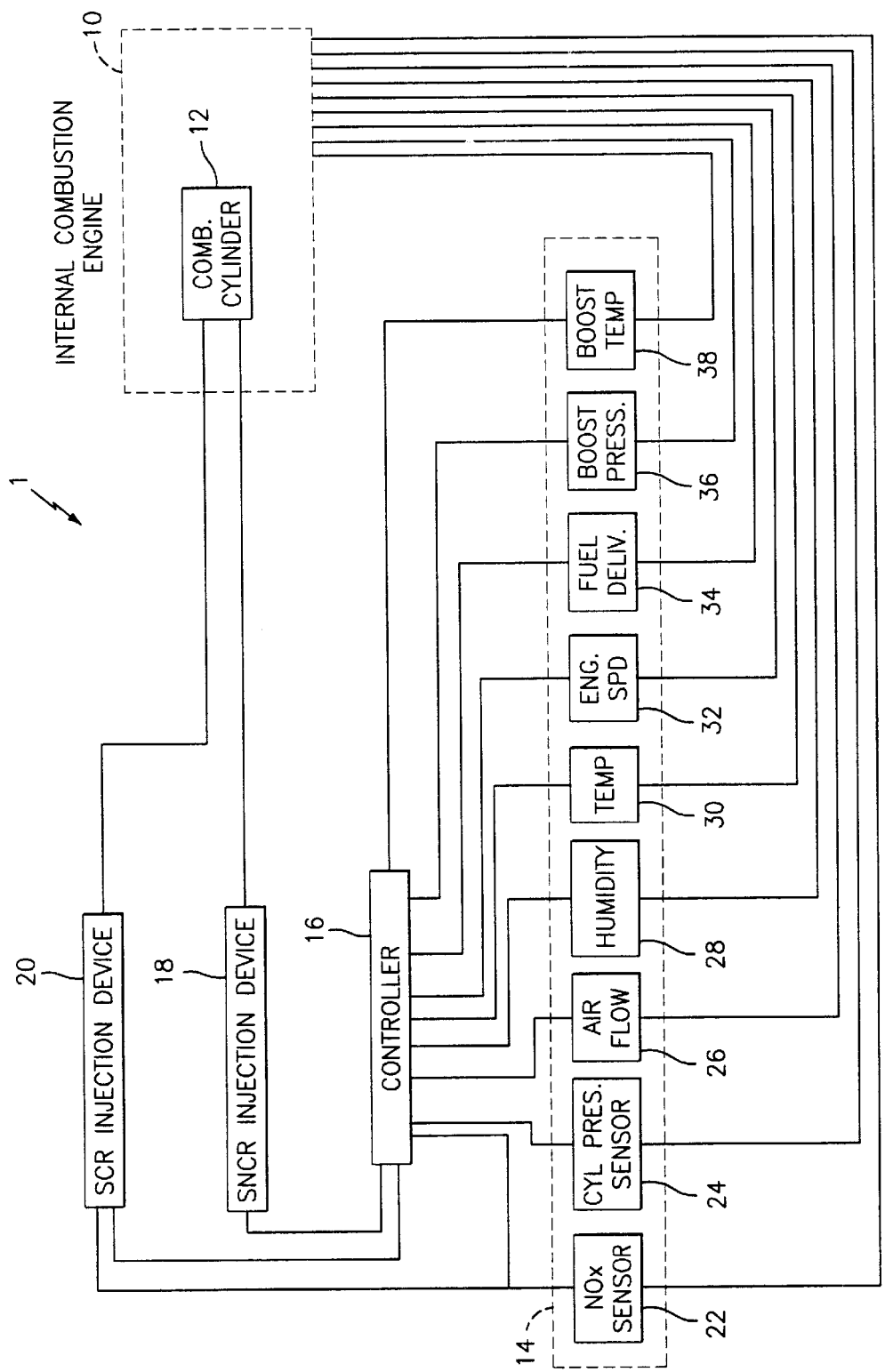
FIG. 1A is a block diagram illustrating a direct in-cylinder reductant injection system.

As discussed hereinabove, two ways to achieve NOx conversion during the operation of an engine are by applying the SCR method or the SNCR method to the engine operation. Unfortunately, although the SCR method has a steady state NOx conversion efficiency of greater than 90% the NOx conversion efficiency drops to approximately 80% during transient cycles within acceptable ammonia ($NH_3$) slip levels. Moreover, application of the SNCR method has only achieved a NOx conversion efficiency of between 20% and 50%, typically. Therefore, it can be seen that application of either of the above methods fails to produce a transient condition NOx conversion result that satisfies future emission standards. However, one way to achieve a high total NOx conversion efficiency during both steady state operating conditions and transient operating conditions is by applying the above methods to an engine in combination. As such, the inherent efficiency and response of the SNCR method combine with those of the SCR method and advantageously join to create a very high total NOx conversion efficiency under both a steady state condition and a transient condition of automotive operation.

The embodiment discussed herein discloses one possible realization of a direct injection system architecture for an internal combustion engine, such as a heavy duty diesel engine, having an over-head camshaft. The proposed embodiment utilizes a normal injection cam through the medium of an intermediate rocker, to drive a reductant injection pump. By so doing, costs are advantageously minimized by avoiding the need for additional cams and/or components. Delivery from this pump is conducted to a normally-open solenoid actuated spill valve which under the direction of a controller, is able to control the timing and quantity of reductant to be injected into that cylinder on that specific cycle. Preferably, injection into the cylinder is made through an outward opening poppet nozzle having a spray pattern that is designed to mix the reductant and the expanding gasses as efficiently as possible. This advantageously allows for a design which does not require a leak-off line from the injector.

An exemplary embodiment is described herein by way of illustration as may be applied to a device having an internal combustion engine and more specifically to a vehicle having an internal combustion engine. While an exemplary embodiment is shown and described hereinbelow, it will be appreciated by those skilled in the art that the invention is not limited to the embodiment and application described herein, but also to any vehicle or device which employs a combustion engine utilizing any fuel (liquid and/or gaseous) or any system which employs a combustion engine where a method for increasing NOx conversion efficiency is desired, such as a motor vehicle and/or a generator. Those skilled in the art will appreciate that a variety of potential configurations and implementations are possible within the scope of the disclosed embodiments.

Figure 1C:
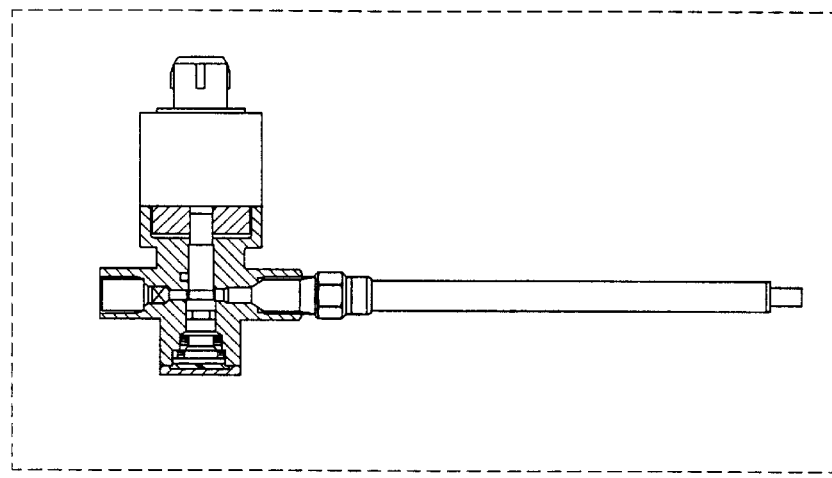
FIG. 1C is a cross sectional view of an alternative reductant pump/injector.
Figure 1B:
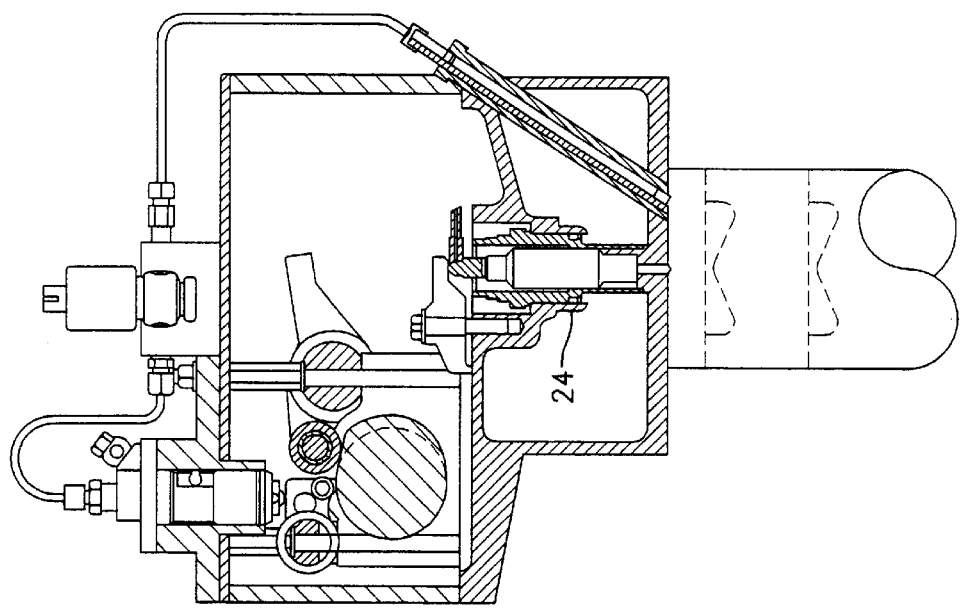
FIG. 1B is a cross sectional view of a direct in-cylinder reductant injection system showing one embodiment of a reductant pump/injector.

Referring to FIGS. 1A, 1B and 1C, a direct in-cylinder reductant injection system is illustrated and discussed. In accordance with an exemplary embodiment, a device or vehicle 1 is shown and includes an internal combustion engine 10 having a combustion cylinder 12, a plurality of vehicle sensors 14, a controller 16, an SNCR injection device 18 and an SCR injection device 20. Plurality of vehicle sensors 14 preferably include a NOx sensor 22 and a cylinder pressure sensor 24, wherein NOx sensor 22 is communicated with internal combustion engine 10 so as to provide for real-time and/or non-real-time post-catalyst monitoring of NOx emissions for NOx reduction confirmation. Moreover, cylinder pressure sensor 24 is also communicated with internal combustion engine 10 so as to provide for a real-time and/or non-real-time monitoring of cylinder pressure. In addition, plurality of vehicle sensors 14 further may include an air mass flow sensor 26, a humidity sensor 28, a temperature sensor 30, an engine speed sensor 32, fuel delivery sensor 34, a boost pressure sensor 36 and boost temperature sensor 38.

In accordance with an exemplary embodiment, SNCR injection device 18 and SCR injection device 20 may be constructed so as to be one injection device disposed within combustion cylinder 12. In this case, as a piston disposed within combustion cylinder 12 is on the downstroke (expansion), the injection device would inject a reductant into combustion cylinder 12 so as to initiate an SNCR process and when the piston was on the upstroke (exhaust stroke), the injection device would inject a reductant into combustion cylinder 12 so as to initiate a downstream selective catalytic NOx reduction process. This would advantageously allow for the use of only one injection device as an SNCR injection device 18 and an SCR injection device 20.

Air mass flow sensor 26 is communicated with internal combustion engine 10 and controller 16 wherein, air mass flow sensor 26 measures the airflow into combustion cylinder 12 of internal combustion engine 10 and communicates the airflow measurement to controller 16. In addition, humidity sensor 28 is communicated with internal combustion engine 10 and controller 16 wherein, humidity sensor 28 measures the humidity of the air entering combustion cylinder 12 and communicates the humidity measurement to controller 16. Furthermore, temperature sensor 30 is communicated with internal combustion engine 10 and controller 16 wherein, temperature sensor 30 measures the temperature of the air entering combustion cylinder 12 and communicates the temperature measurement to controller 16. Controller 16 advantageously processes these variables, which may include cylinder pressure, and generates a NOx estimation model. In accordance with an exemplary embodiment, although controller 16 preferably generates the NOx estimation model using a Zeldovich reaction mechanism and/or a Watson reaction mechanism, the NOx estimation model may be generated using any reaction mechanism, device and/or method suitable to the desired end purpose.

Furthermore, engine speed sensor 32, fuel delivery sensor 34, boost pressure sensor 36 and boost temperature sensor 38 are preferably communicated with controller 16 and internal combustion engine 10. Moreover, combustion cylinder 12 preferably includes an exhaust valve and an exhaust valve opening wherein the exhaust valve is movably associated with the exhaust valve opening so as to allow the exhaust valve opening to be opened and/or closed.

In accordance with an exemplary embodiment, application of cylinder pressure sensing technology may be employed in conjunction with SNCR/SCR NOx reduction technology as described herein. Although a non-intrusive cylinder pressure sensor and an associated Pressure Ratio Measurement (PRM) and/or heat release (HR) estimation devices are preferred, any devices and/or method may be used. This information, in conjunction with other available vehicle sensor data such as air mass flow, humidity, and intake temperature, may be used as variable inputs to a NOx estimation model, perhaps utilizing the Zeldovich and/or Watson reaction mechanism and/or any other reaction mechanism suitable to the desired end purpose. This would then yield an estimated NOx value on the requisite cylinder-by-cylinder, cycle-by-cycle basis which may be used for effective control of the SNCR/SCR system.

Figure 4:
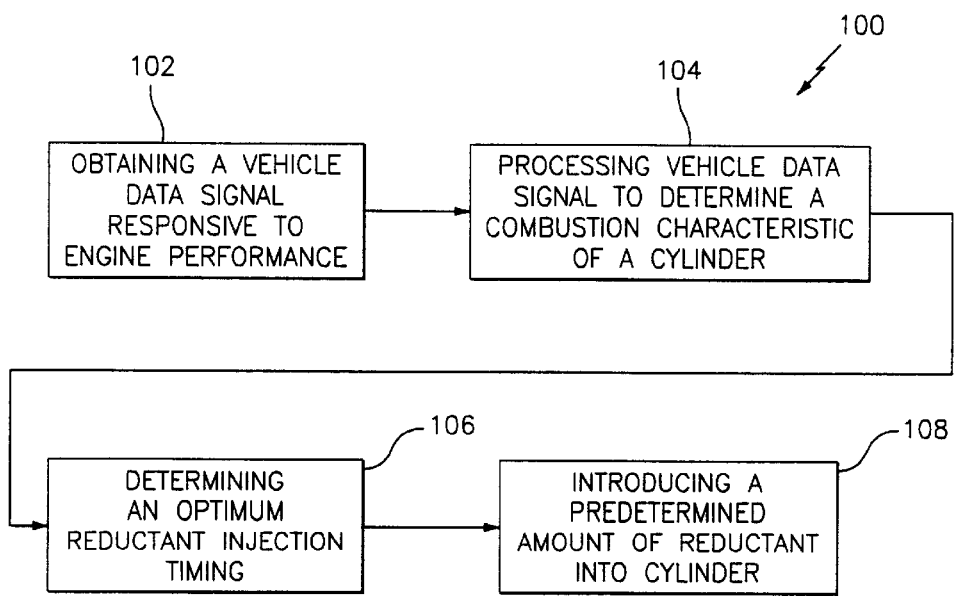
FIG. 4 is a block diagram illustrating method for increasing NOx conversion efficiency in an internal combustion engine.

Referring to FIG. 4, a method for increasing NOx conversion efficiency in an internal combustion engine 100 is illustrated and discussed. In accordance with an exemplary embodiment, as internal combustion engine 10 is operated, vehicle data signals responsive to the performance of internal combustion engine 10 are obtained from vehicle data sensors 14, as shown in step 102. These vehicle data signals preferably include engine speed, fuel delivery, humidity, air mass flow, boost pressure, boost temperature and/or cylinder pressure. Once these vehicle data signals have been obtained, controller 16 processes these vehicle data signals so as to determine a combustion characteristic of the combustion cylinder, such as intake charge gas properties for the combustion cylinder being considered at the point of intake valve (and/or port) closure, as shown in step 104.

The instantaneous combustion cylinder pressure is monitored via cylinder pressure sensor 24 and evaluated so as to estimate the NOx content of combustion cylinder 12. Moreover, controller 16 creates and evaluates an SCR catalyst efficiency map responsive to the current and immediate past internal combustion engine operating conditions. Controller 16 determines, appropriate conversion efficiencies that should be assumed via SCR injection device 20, and/or via SNCR injection device 18. The quantity of reductant to be introduced into combustion cylinder 12 so as to achieve a desired conversion efficiency via NOx reduction contribution from SNCR injection device 18 may be achieved via calculations, estimations, and/or look-up tables.

Figure 2:
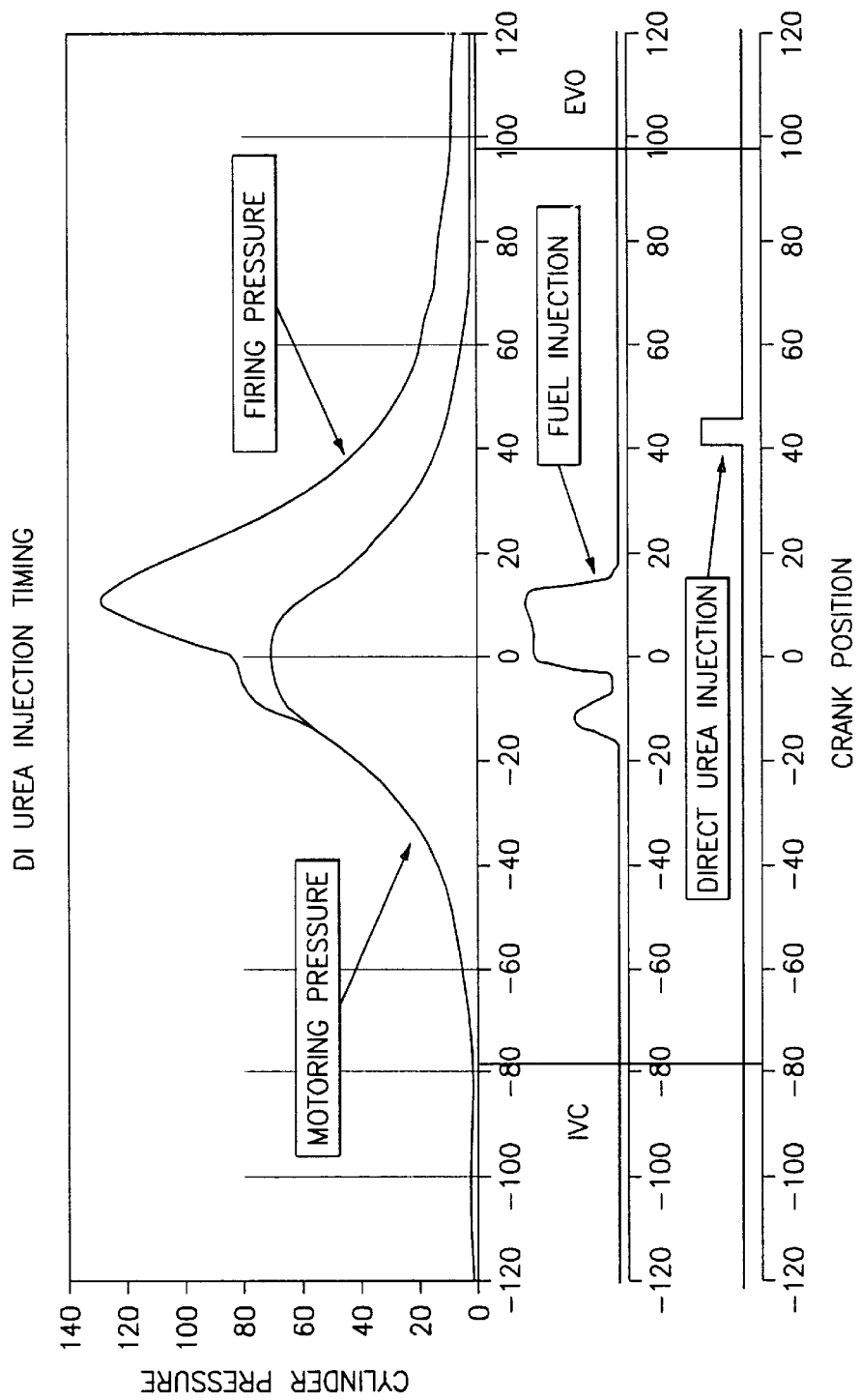
FIG. 2 is a graph illustrating a direct injection reductant timing scheme.
Figure 3:
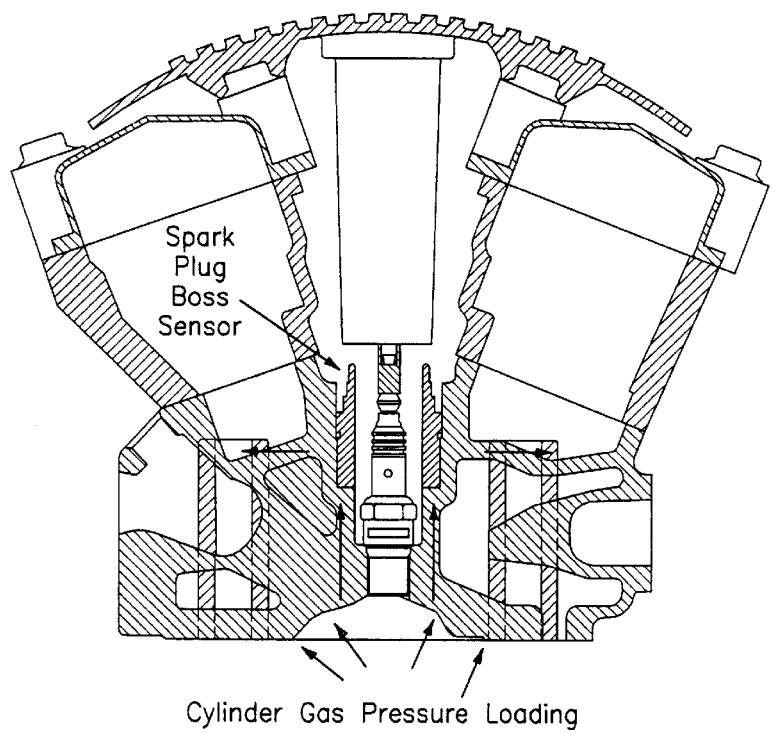
FIG. 3 is a cross sectional view of a compression cylinder showing a cylinder gas pressure sensor.

Once this has been achieved, an optimum reductant injection timing scheme is determined, as shown in step 106. Referring to FIGS. 2 and 3, this is preferably accomplished by calculating the instantaneous combustion cylinder bulk gas temperature via the aforementioned NOx estimation model. This instantaneous combustion cylinder bulk gas temperature may then be used to identify the optimum reductant injection timing. Once this has been determined, a predetermined amount of reductant is introduced into combustion cylinder 12 in a manner responsive to the optimum reductant injection timing, as shown in step 108. This is preferably accomplished via SNCR injection device 18, which injects the predetermined amount of reductant into combustion cylinder 12 so as to effect in-cylinder NOx conversion. Controller 16 then calculates an estimate of the $NH_3$ (ammonia) slip from combustion cylinder 12 in a manner responsive to the likely NOx conversion efficiency and the predetermined amount of reductant injected into combustion cylinder 12. In accordance with an exemplary embodiment, the predetermined amount of reductant is preferably an optimum reductant quantity suitable to the desired end purpose.

As the exhaust valve opening (EVO) of combustion cylinder 12 occurs, this $NH_3$ (ammonia) slip now becomes available to the SCR catalyst. (It should be noted that, in certain situations, responsive to the geometry of internal combustion engine 10, a predetermined amount of additional reductant required by the SCR catalyst may be injected into combustion cylinder 12 at this time. This advantageously allows that no additional reductant injection system in the exhaust be required). At this point, based on knowledge of the SCR catalyst operating condition, such as the transport delay from combustion cylinder 12 to catalyst and the SNCR $NH_3$ (ammonia) slip, any additional reductant required by the catalyst at the time the contents of combustion cylinder 12 reach the catalyst is determined. This may advantageously be calculated via controller 16. Once this additional reductant quantity has been determined, the additional reductant is injected into combustion cylinder 12 at and/or near the point of EVO.

It is considered within the scope of the embodiments that an additional dosing injector may be included in the exhaust ahead of a reducing catalyst so as to allow for additional reductant injection following SNCR NOx conversion. Moreover, it is further considered within the scope of the embodiments that a reductant injector may be associated with and/or disposed within the cylinder head exhaust valve opening so as to allow reductant injection post cylinder for SCR. This would provide at least two advantages. First, this would allow the reductant injector to survive because it would be cooled, unlike a reductant injector disposed within the exhaust system (downstream). Second, this would allow for a larger selection of injector/atomizer technologies to be considered.

In accordance with an exemplary embodiment, reductant injection preferably occurs after combustion and is timed in a manner responsive to engine speed and engine load. This is because the NOx conversion reaction occurs as the cylinder gases are falling through a temperature window, wherein the temperature window is approximately in the range of 1100K to 1300K. Moreover, SNCR advantageously has a very rapid rate of response, and to exploit this characteristic, an equally rapid response is desired from the control system. By combining the inherent efficiency and response characteristics of SNCR with those of SCR along with a rapidly responding control system, a direct in-cylinder reductant injection-system 1 may advantageously be created with a very high total efficiency under the transient conditions of automotive operation.

Referring to FIG. 1C, an alternative SNCR injection device 18 is shown. In accordance with an exemplary embodiment, SNCR injection device 18 may be any SNCR injection device 18 suitable to the desired end purpose, such as a mechanical injector, electromechanical injector and/or an electrical injector.

It should be recognized that the combination of highly efficient NOx reduction system having a rapid response capability enabled by a real-time NOx estimation, advantageously allows other previously unobtainable emission related strategies possible. These include the ability to modify the engine rating "on-the-fly" responsive to local ambient conditions so as, for example, to provide more engine power on a humid day and/or respond to local environmental regulation. Moreover, an accurate real time estimation capability will advantageously allow the engine calibration to be set closer to the NOx limit than current ability allows.

In accordance with an exemplary embodiment, the processing of the above description may be implemented by a controller disposed internal, external, or internally and externally to an engine control unit (ECU). In addition, processing of the above may be implemented through a controller operating in response to a computer program. In order to perform the prescribed functions and desired processing, as well as the computations therefore, the controller may include, but not be limited to, a processor(s), computer(s), memory, storage, register(s), timing, interrupt(s), communication interfaces, and input/output signal interfaces, as well as combinations comprising at least one of the foregoing.

In accordance with an exemplary embodiment, processing of FIG. 4 may be implemented through a controller 16, an engine control unit and/or a processing device operating in response to a computer program. In order to perform the prescribed functions and desired processing, as well as the computations therefore (e.g., the execution of fourier analysis algorithm(s), the control processes prescribed herein, and the like), the controller may include, but not be limited to, a processor(s), computer(s), memory, storage, register(s), timing, interrupt(s), communication interfaces, and input/output signal interfaces, as well as combinations comprising at least one of the foregoing. For example, the controller may include signal input signal filtering to enable accurate sampling and conversion or acquisitions of such signals from communications interfaces. It is also considered within the scope of the invention that the processing of FIG. 4 may be remotely implemented by a controller 16 located external, and/or internal to an engine control unit (ECU) and/or from internal combustion engine 10.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer and/or controller, the computer becomes an apparatus for practicing the invention. Existing systems having reprogrammable storage (e.g., flash memory) can be updated to implement the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A reductant injection system for an internal combustion engine comprising:
    a selective reduction system communicated with the internal combustion engine;
    a vehicle sensor communicated with the internal combustion engine;
    a controller, wherein said controller is communicated with said selective reduction system and said vehicle sensor; and
    a reductant storage device communicated with said selective reduction system.

2. A reductant injection system as in claim 1, wherein said internal combustion engine includes a combustion cylinder and wherein said selective reduction system includes a selective non-catalytic reduction injection device communicated with said combustion cylinder so as to allow for the initiation of a selective non-catalytic reduction process.

3. A reductant injection system as in claim 1, wherein said internal combustion engine includes a combustion cylinder and wherein said selective reduction system includes a selective catalytic reduction injection device communicated with said combustion cylinder so as to allow for the initiation of a selective catalytic reduction process.

4. A reductant injection system as in claim 1, wherein said internal combustion engine includes a catalyst, a reductant injector and a combustion cylinder having an exhaust valve opening, wherein said reductant injector is associated with said catalyst and said exhaust valve opening so as to allow injection of a reductant into exhaust ahead of said catalyst.

5. A reductant injection system as in claim 4, wherein said reductant injector is disposed within said exhaust valve opening.

6. A reductant injection system as in claim 1, wherein said vehicle sensor includes a NOx sensor and a cylinder pressure sensor.

7. A reductant injection system as in claim 1, wherein said vehicle sensor further includes an air mass flow sensor, a humidity sensor and an intake temperature sensor.

8. A reductant injection system as in claim 1, wherein said controller includes an engine control unit.

9. A reductant injection system as in claim 1, wherein said reductant storage device includes a reductant, wherein said reductant includes an ammonia compound.

10. A method for increasing NOx conversion efficiency in an internal combustion engine having a reductant injection system, comprising:
    obtaining a vehicle data signal responsive to the performance of the internal combustion engine;
    processing said vehicle data signal so as to determine a combustion characteristic of a combustion cylinder;
    determining an optimum reductant injection timing; and
    introducing a predetermined amount of reductant into said combustion cylinder responsive to said optimum reductant injection timing.

11. The method of claim 10, wherein said obtaining includes communicating said vehicle data signal to a controller.

12. The method of claim 10, wherein said vehicle data signal includes engine speed, humidity, air mass flow and cylinder pressure.

13. The method of claim 10, wherein said vehicle data signal includes a fuel delivery characteristic, a boost pressure and a boost temperature.

14. The method of claim 10, wherein said combustion characteristic includes an intake charge gas characteristic for said combustion cylinder.

15. The method of claim 10, wherein said processing includes estimating the NOx content of said combustion cylinder in a manner responsive to the combustion cylinder pressure.

16. The method of claim 10, wherein said processing includes determining a NOx conversion efficiency in a manner responsive to an SCR catalyst efficiency map and internal combustion engine operating conditions.

17. The method of claim 10, wherein said processing includes determining the quantity of reductant to be introduced into the internal combustion engine.

18. The method of claim 10, wherein said determining includes determining said optimum reductant injection timing in a manner responsive to said combustion characteristic.

19. The method of claim 10, wherein said determining includes determining said optimum reductant injection timing in a manner responsive to an instantaneous combustion cylinder bulk gas temperature.

20. The method of claim 10, wherein said introducing includes introducing said reductant into said combustion cylinder responsive to said optimum reductant injection timing.

21. The method of claim 10, wherein said introducing includes introducing said reductant into said combustion cylinder via a selective non-catalytic reduction injection device so as to effect a selective non-catalytic NOx reduction process.

22. The method of claim 10, wherein said introducing includes estimating an ammonia slip quantity, wherein said ammonia slip quantity is responsive to said predetermined amount of reductant.

23. The method of claim 10, wherein said introducing includes estimating an ammonia slip quantity, wherein said ammonia slip quantity is responsive to a predetermined NOx conversion efficiency.

24. The method of claim 10, wherein said introducing includes determining whether a predetermined amount of additional reductant is required to achieve a desired NOx conversion efficiency.

25. The method of claim 24, wherein said introducing includes introducing said additional reductant into said combustion cylinder via a selective catalytic reduction injection device so as to effect a downstream selective catalytic NOx reduction process.

26. The method of claim 24, wherein said combustion cylinder includes a reductant injector associated with an exhaust valve opening and wherein said introducing includes introducing said additional reductant post cylinder.

27. The method of claim 26, wherein said introducing includes introducing said additional reductant into said combustion cylinder while said exhaust valve opening is opened.

28. A medium encoded with a machine-readable computer program code for increasing NOx conversion efficiency in an internal combustion engine having a reductant injection system, said medium including instructions for causing controller to implement a method comprising:

obtaining a vehicle data signal responsive to the engine performance of the internal combustion engine;

processing said vehicle data signal so as to determine a combustion characteristic of a combustion cylinder;

determining an optimum reductant injection timing; and introducing a predetermined amount of reductant into said combustion cylinder responsive to said optimum reductant injection timing.

29. The medium of claim 28, wherein said obtaining includes communicating said vehicle data signal to a controller.

30. The medium of claim 28, wherein said processing includes estimating the NOx content of said combustion cylinder in a manner responsive to the combustion cylinder conditions.

31. The medium of claim 28, wherein said processing includes determining a NOx conversion efficiency in a manner responsive to an SNCR efficiency map and internal combustion engine operating conditions.

32. The medium of claim 28, wherein said processing includes determining the quantity of reductant to be introduced into the internal combustion engine.

33. The medium of claim 28, wherein said determining includes determining said optimum reductant injection timing in a manner responsive to said combustion characteristic.

34. The medium of claim 28, wherein said determining includes determining said optimum reductant injection timing in a manner responsive to an instantaneous combustion cylinder bulk gas temperature.

35. The medium of claim 28, wherein said introducing includes introducing said reductant into said combustion cylinder responsive to said optimum reductant injection timing.

36. The medium of claim 28, wherein said introducing includes introducing said reductant into said combustion cylinder via a selective non-catalytic reduction injection device so as to effect a selective non-catalytic NOx reduction process.

37. The medium of claim 28, wherein said introducing includes estimating an ammonia slip quantity, wherein said ammonia slip quantity is responsive to said predetermined amount of reductant.

38. The medium of claim 28, wherein said introducing includes estimating an ammonia slip quantity, wherein said ammonia slip quantity is responsive to a predetermined NOx conversion efficiency.

39. The medium of claim 28, wherein said introducing includes determining whether a predetermined amount of additional reductant is required to achieve a desired NOx conversion efficiency.

40. The medium of claim 39, wherein said introducing includes introducing said additional reductant into said combustion cylinder via a selective catalytic reduction injection device so as to effect a downstream selective catalytic NOx reduction process.

41. The medium of claim 39, wherein said combustion cylinder includes a reductant injector associated with an exhaust valve opening and wherein said introducing includes introducing said additional reductant post cylinder.

42. The medium of claim 41, wherein said introducing includes introducing said additional reductant into said combustion cylinder while said exhaust valve opening is opened.

* * * * *